United States Patent
Thompson et al.

(10) Patent No.: US 6,735,746 B2
(45) Date of Patent: May 11, 2004

(54) METHOD AND APPARATUS FOR TLB ENTRY TRACKING, COLLISION DETECTION, AND ADDRESS REASSIGNMENT, IN PROCESSOR TESTCASES

(75) Inventors: Ryan C. Thompson, Fort Collins, CO (US); John W. Maly, LaPorte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

(21) Appl. No.: 10/163,895

(22) Filed: Jun. 4, 2002

(65) Prior Publication Data

US 2003/0226123 A1 Dec. 4, 2003

(51) Int. Cl.$^7$ ............................................. G06F 17/50
(52) U.S. Cl. ....................... 716/4; 716/1; 716/2; 716/3; 716/4; 714/33; 714/733
(58) Field of Search .......................... 716/1–4; 414/733, 414/33, 11; 713/1; 711/3, 207, 203, 169

(56) References Cited

U.S. PATENT DOCUMENTS

| 5,771,241 A | * | 6/1998 | Brummel | 714/733 |
| 5,784,550 A | * | 7/1998 | Brockmann et al. | 714/33 |
| 5,815,688 A | * | 9/1998 | Averill | 716/4 |
| 6,058,253 A | * | 5/2000 | Lowe | 716/2 |
| 6,065,091 A | * | 5/2000 | Green | 711/3 |
| 6,473,853 B1 | * | 10/2002 | Spiegel et al. | 713/1 |

OTHER PUBLICATIONS

IBM Technical Disclosure Bulletin, Event Tracer to Verify Processor Design Features that are Below the Architectural Level, NN9310185, Oct. 1, 1993, vol. No.:36 Issue No.:10, p. No.: 185–186.*

IBM Technical Disclosure Bulletin, "Test Case Analysis on Microcode", NN930169, Jan. 1, 1993, vol. No.:36, Issue No.: 1, p. No.: 69.*

"PowerPC 601/604 Multiprocessor Random Verification methodology", Oct. 1, 1994, IBM Technical Bulletin, vol. No.: 37, Ussue No.:10, p. No.: 557–562.*

Saavedra et al., "Measuring cache and TLB performance and their effect on benchmark runtimes", Computers, IEEE Transactions on, vol.:44, Issue:10, Oct. 1995 pp.:1223–1235.*

* cited by examiner

Primary Examiner—Matthew Smith
Assistant Examiner—Helen Rossoshek

(57) ABSTRACT

A method of converting a testcase designed to execute on a first member of a processor family to a converted testcase for execution on a second member of a processor family provides particularly for conversion of Translation Lookaside Buffer usage. The method is operable on a computer. The method involves automatically comparing each TLB location used by the testcase to TLB locations available in the second member of the processor family, or, if the second member of the processor family is a multiprocessor circuit, a standard partition available in the second member of the processor family. If the testcase uses only TLB locations that are available in the second member of the processor family, indicating that the testcase is runable on the second member of the processor family. In particular embodiments, TLB locations used by the testcase are automatically reassigned to locations available in the TLB, or standard partition of the TLB, in the second member of the processor family.

16 Claims, 2 Drawing Sheets

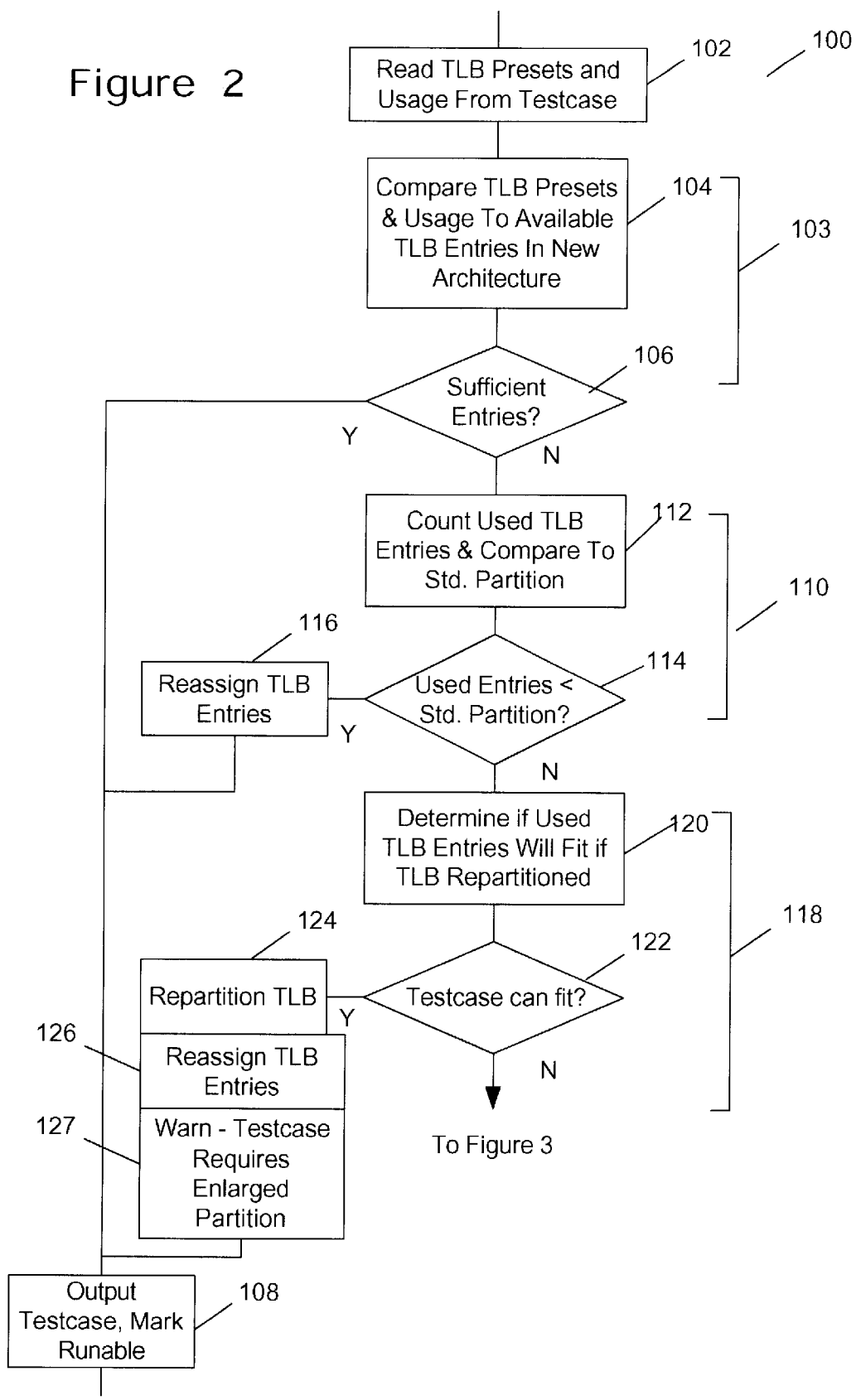

METHOD AND APPARATUS FOR TLB ENTRY TRACKING, COLLISION DETECTION, AND ADDRESS REASSIGNMENT, IN PROCESSOR TESTCASES

FIELD OF THE INVENTION

The invention relates to the fields of Computer-Aided Design (CAD), and test code for design and test of digital computer processor circuits. The invention particularly relates to CAD programs for converting existing testcases to operate on new members of a processor. The invention specifically relates to conversion of testcases having Translation Lookaside Buffer (TLB) initialization or references.

BACKGROUND OF THE INVENTION

The computer processor, microprocessor, and microcontroller industries are evolving rapidly. Many processor integrated circuits marketed in 2002 have ten or more times the performance of the processors of 1992. It is therefore necessary for each manufacturer to continually design new products if they are to continue producing competitive devices.

Testcases

When a design for a new processor integrated circuit is prepared, it is necessary to verify that the design is correct through design verification. It is known that design verification can be an expensive and time-consuming process. It is also known that design errors not found during design verification can not only be embarrassing when they are ultimately discovered, but provoke enormously expensive product recalls.

Design verification typically requires development of many test codes. These test codes are often prepared by highly paid engineers and are therefore expensive to develop. Each test code is then run on a computer simulation of the new design. Each difference between the computer simulation of a test code and expected results is analyzed to determine whether there is an error in the design, in the test code, in the simulation, or in several of these. Analysis is expensive as it is often performed manually by highly paid engineers.

Typically, the test codes are constructed in a modular manner. Each code has one or more modules, each intended to exercise one or more particular functional units in a particular way. Each test code incidentally uses additional functional units. For example, a test code intended to exercise a floating point processing pipeline in a full-chip simulation will also use instruction decoding and memory interface (including Cache Memory and Translation Lookaside Buffer) functional units. Similarly, a test code intended to exercise integer execution units will also make use of memory interface functional units.

The simulation of the new design on which each test code is run may include simulation of additional "off-chip" circuitry. For example, this off-chip circuitry may include system memory. Off-chip circuitry for exercising serial ports may include loopback multiplexors for coupling serial outputs to serial inputs, as well as serializer and deserializer units.

The combination of test code with configuration and setup information for configuring the simulation model is a testcase.

It is known that testcases should be self-checking; as they must often be run multiple times during development of a design. Each testcase typically includes error-checking information as necessary to verify correct execution.

Once a processor design has been fabricated, testcases are often re-executed on the integrated circuits. Selected testcases may be logged and incorporated into production test programs.

Memory Hierarchy

Modern high-performance processors implement a memory hierarchy having several levels of memory. Each level typically has different characteristics, with lower levels typically smaller and faster than higher levels.

A Cache Memory is typically a lower level of a memory hierarchy. There are often several levels of cache memory, one or more of which are typically located on the processor integrated circuit. Cache memory is typically equipped with mapping hardware for establishing a correspondence between cache memory locations and locations in higher levels of the memory hierarchy. The mapping hardware typically provides for automatic replacement (or eviction) of old cache contents with newly referenced locations fetched from higher-level members of the memory hierarchy. This mapping hardware often makes use of a cache tag memory. For purposes of this application cache mapping hardware will be referred to as a tag subsystem.

Many programs access memory locations that have either been recently accessed, or are located near recently accessed locations. These locations are likely to be found in fast cache memory, and therefore more quickly accessed than other locations. For these reasons, it is known that cache memory often provides significant performance advantages.

Most modern computer systems implement virtual memory. Virtual memory provides one or more large, continuous, "virtual" address spaces to each of one or more executing processes on the machine. Address mapping circuitry is typically provided to translate virtual addresses, as used by the processes to access location in "virtual" address spaces, to physical memory locations in the memory hierarchy of the machine. Typically, each large, continuous, virtual address space is mapped to one or more, potentially discontinuous pages in a single physical memory address space. This address mapping circuitry often incorporates a Translation Lookaside Buffer (TLB).

A TLB typically has multiple locations, where each location is capable of mapping a page, or other portion, of a virtual address space to a corresponding portion of a physical memory address space.

New Processor Designs

Many new processor integrated circuit designs have similarities to earlier designs. New processor designs are often designed to execute the same, or a superset of, instruction set of an earlier processor. For example, and not by way of limitation, some designs may differ significantly from previous designs in memory interface circuitry, but have similar floating point execution pipelines and integer execution pipelines. Other new designs may provide additional execution pipelines to allow a greater degree of execution parallelism than previous designs. Yet others may differ by providing for multiple threads or providing multiple processor cores in different numbers or manner than their predecessors; multiple processor or multiple thread integrated circuits may share one or more levels of a memory hierarchy between threads. Still others may differ primarily in the configuration of on-chip I/O circuitry.

Many manufactures of computer processor, microprocessor, and microcontroller devices have a library of existing testcases originally written for verification of past processor designs.

It is desirable to re-use existing testcases from a library of existing testcases in design verification of a new design. These libraries may be extensive, representing an investment of many thousands of man-hours. It is known, however, that some existing testcases may not be compatible with each new processor design.

Adaptation of existing testcases to new processor designs has largely been a manual task. Skilled engineers have reviewed documentation and interviewed test code authors to determine implicit assumptions and other requirements of the testcases. They have then made changes manually, tried the modified code on simulations of the new designs, and analyzed results. This has, at times, proved expensive.

Adapting Testcases

It is desirable to automate the process of screening and adapting existing testcases to new processor designs.

In a computer system during normal operation, TLB entries are dynamically managed by an operating system kernel.

During design verification of a processor or multiprocessor integrated circuit, it is generally desirable to limit the scope of many individual testcases to simplify debugging. For that reason, most testcases are run without an operating system kernel; and therefore often contain particular TLB entries as part of their setup information, or may contain code that directly addresses TLB locations.

Some testcases, including but not limited to testcases that test for interactions between successive operations in pipelines, are particularly sensitive to execution timing. These testcases may include particular cache entries as part of their setup information. Similarly, testcases intended to exercise memory mapping hardware, including a TLB, or intended to exercise cache functions, may also require particular cache entries as part of their setup information.

New processor designs may have memory mapping hardware similar to, but different from, prior designs. For example, a new design may provide a different number of TLB mapping locations than a prior design, or may provide for sharing a predetermined number of TLB mapping locations among several instruction streams or processors. Similarly, a new processor design may provide a different cache size or organization, or provide for sharing of one or more levels of cache by more than one instruction stream.

It is known that memory hierarchy elements, such as cache and TLBs, on a processor circuit often consume more than half of the circuit area. It is also known that some applications require more of these elements than others. There are often competitive pressures to proliferate a processor family down to less expensive integrated circuits having smaller memory elements, and upwards to more expensive integrated circuits having multiple processors and potentially larger memory elements.

Screening and Converting Testcases

In a particular library of existing testcases there are many testcases each containing TLB entries. These testcases do not provide for dynamic management of the TLB, and will therefore execute correctly only if sufficient TLB space is provided for the preset entries associated with the testcase. In this particular library, there are also several testcases that have cache entries associated with them.

A particular new processor design has at least one processor, and may have multiple processor cores, on a single integrated circuit. This circuit has a TLB and memory hierarchy that may be shared between processors.

It is desired to screen the existing library to determine which testcases will run on this new design without conversion, and to convert remaining testcases so that they may run properly on the new design.

Further, each processor core of the new design should be tested. Testing complex processor integrated circuits can consume considerable time on very expensive test systems. It is therefore particularly desirable to execute multiple testcases simultaneously, such that as many processor cores as reasonably possible execute testcases simultaneously.

When multiple testcases, each using a shared resource, are simultaneously executed on a multiple-core integrated circuit it is necessary to eliminate resource conflicts between them. For example, if a TLB location is initialized by a first testcase, and altered by another testcase before the first testcase finishes, the first testcase may behave in an unexpected manner, an event known as a collision. If a TLB is shared among multiple processor cores, it is necessary to allocate locations in that TLB to particular testcases. Similarly, locations in other levels of the memory hierarchy may also require allocation.

SUMMARY

A method and computer program product is provided for automatically screening testcases originally prepared for a previous processor design for compatibility with a new processor design having different memory interface circuitry than the previous processor design. The process and computer program product is capable of automatically remapping memory interface circuit usage to allow certain otherwise-incompatible, preexisting, testcases to execute correctly on the new processor design.

The method is particularly applicable to testcases having TLB entries as part of their setup information. The method is applicable to new processor designs having TLBs shared among multiple threads or processors, or new designs having smaller TLBs, than the processors for which the testcases were originally developed.

The method operates by reading setup and testcode information from one or more testcases. TLB entry usage and initialization information is then extracted from the testcase.

In a first level of automated screening and conversion, TLB entries initialized and used by a testcase are verified against those available in a standard partition available on a new architecture. If all TLB entries initialized or used fit in the partition, the testcase is marked runable on the new architecture, and outputted.

In a particular embodiment, a second level of automated screening and conversion is provided. In this embodiment, TLB entries initialized and used by the testcase are counted. The count of TLB entries used in the testcase is compared with a predetermined number of TLB entries, corresponding with the number of TLB entries available on a standard partition of a new architecture. If the standard TLB partition has sufficient space for the entries used, but some have different identification than those normally available, TLB entries used by the testcase are reassigned to those available. Reassignment includes reassigning unavailable TLB location presets and references together to available locations. This step may involve modification of the test code of the testcase to reassign used locations. The converted testcase is then marked runable on the new architecture, and outputted.

In another embodiment, a third level of automated screening and conversion is provided. In this embodiment, the count of TLB entries initialized and used by the testcase is compared with the number of TLB entries that is available in a larger partition. The larger partition is sized such that some, but not all, of the multiple processor cores can execute testcases simultaneously. Those testcases that will fit in the number of TLB entries have TLB location presets and references reassigned as necessary. The testcase is then marked runable in the larger partition on the new architecture, and outputted.

In another embodiment, a fourth level of automated screening and conversion is provided. In this embodiment, the count of TLB entries initialized and used by the testcase is compared with the maximum number of TLB entries that can be made available in the new architecture by allocating as many TLB entries to the testcase as possible. Those testcases that will fit in the maximum number of TLB entries have TLB location presets and references reassigned as necessary. The testcase is then marked runable in a stand-alone partition on the new architecture, and outputted.

Remaining testcases are flagged as requiring manual conversion.

BRIEF DESCRIPTION OF THE DRAWINGS

FIG. 2, a first part of a flowchart of an automatic testcase screening and conversion utility.

DETAILED DESCRIPTION

Figure 1:
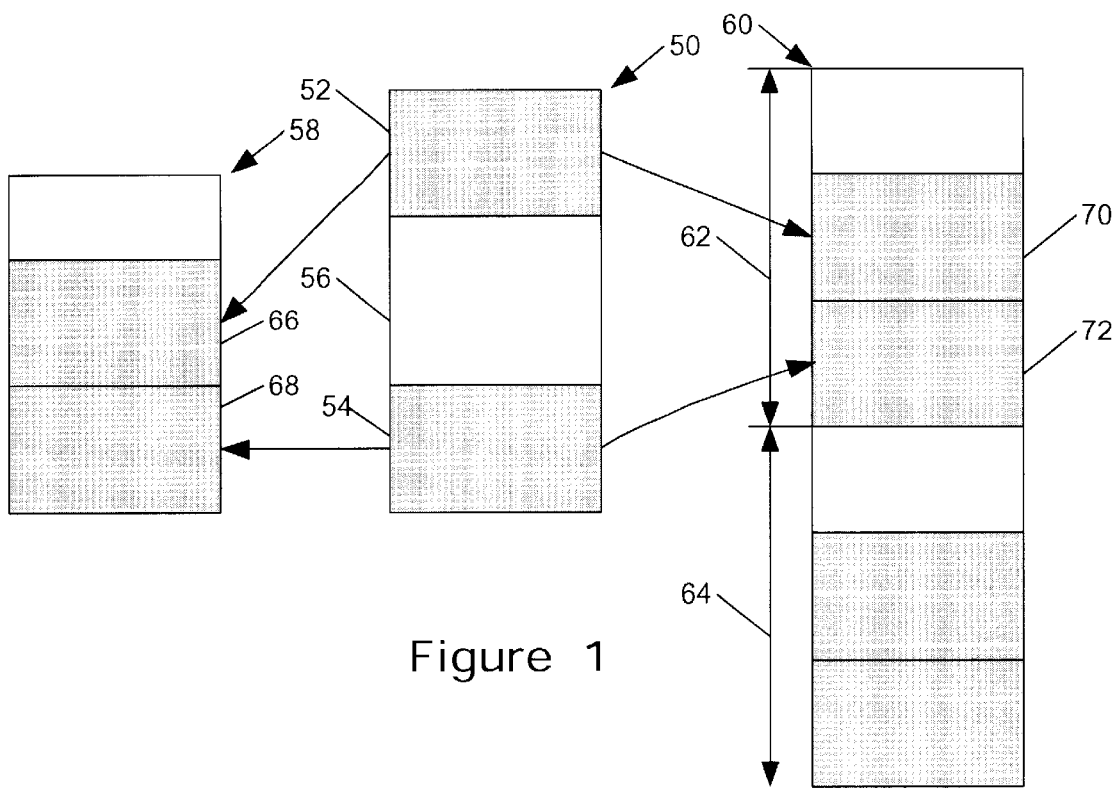
FIG. 1 is an illustration of TLBs of small, medium, and large members of a processor family.

A testcase. intended to be executed on either a simulation or actual hardware of a processor integrated circuit, is extracted from a library of pre-existing testcases. The testcase is designed to use particular locations 52, 54 (FIG. 1) in a TLB 50. There may also be unused locations 56 in the TLB.

A new processor integrated circuit architecture also having a TLB is defined. This architecture provides a TLB that may, but need not, be the same size as that of the original TLB 50. The new processor architecture may have a smaller TLB 58 than the original TLB 50, or it may have a TLB 60 that is shared among multiple processor cores.

The new architecture may provide for simultaneous execution of multiple instruction streams each allocated to a particular partition 62, 64 of the TLB. When multiple instruction streams execute on this new architecture, each stream is capable of being allocated a standard-sized TLB partition 62, 64; when fewer streams or a single stream executes, the executing stream is capable of being allocated a enlarged TLB partition.

In a particular embodiment, the testcase is input to a digital computer executing an automated testcase screening and conversion method 100 (FIG. 2). Setup and testcode information is read from each testcase. TLB entry usage and setup information is read 102 from the setup and testcode information.

In a first level 103 of automated screening and conversion, TLB entries initialized and used by the testcase 52, 54 are compared 104 to available TLB entries in a standard-sized TLB partition 58, 62 available on a new architecture. This number of available TLB entries is the size of the TLB, or the size of a standard TLB partition, according to whether the new processor architecture is capable of running multiple instruction streams. The standard-sized partition may be placed at a particular location in the TLB. If 106 all initialized and used TLB entries fit, the testcase is marked runable on the new architecture, and outputted 108 to a library of converted testcases.

In a particular embodiment, a second level 110 of automated screening and conversion is provided. In this embodiment, TLB entries initialized and used by the testcase are counted 112. The count of used entries is compared 112 to the number of available TLB entries in the standard-sized partition expected available on the new architecture. If 114 the count is less than or equal to the number available, the TLB entries used by the testcase are reassigned 116 to TLB locations 66, 68 or 70, 72 within the standard TLB partition at a particular location in the TLB. Reassignment may require alteration of setup information. In some cases, reassignment may require alteration of TLB addresses referenced by test code of the testcase. Both types of reassignment are done as required by the individual testcase. The modified testcase is marked runable on the new architecture, and outputted 108.

In a particular embodiment, a third level 118 of automated screening and conversion is provided. In this embodiment for use with multiprocessor integrated circuits, the count of used entries is compared to the TLB space available if the TLB is repartitioned assuming that some but not all processors are permitted simultaneous execution. The compare determines 120 whether the testcase can fit in the available TLB space if the TLB is repartitioned. If 122 the testcase will fit in a repartitioned TLB, the testcase setup information is modified to ensure that the TLB is repartitioned 124 such that all available TLB locations are allocated to the testcase. Next, the TLB entries used by the testcase are reassigned 126 as needed to TLB locations within the expanded TLB partition. A warning 127 is then generated to indicate that this particular testcase requires an enlarged partition, where parallel execution of one or more, but not all, other instruction streams should be stopped while the testcase is executed. The modified testcase is marked runable on the new architecture, and outputted 108.

Figure 3:
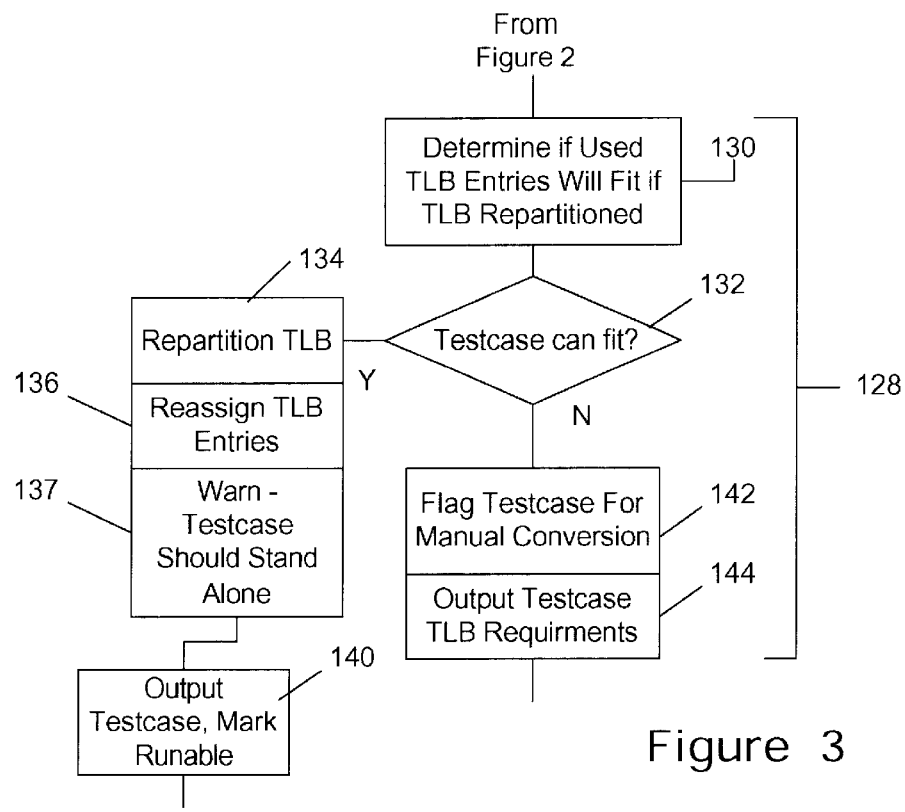
FIG. 3, a second part of a flowchart of an automatic testcase screening and conversion utility.

In a particular embodiment, a fourth level 128 of automated screening and conversion is provided. In this embodiment, the count of used entries is compared to the maximum TLB space available if the TLB is repartitioned, to determine 130 (FIG. 3) whether the testcase can fit in the available TLB space if the entire TLB is allocated to the testcase. If 132 the testcase will fit in a repartitioned TLB, the testcase setup information is modified to ensure that the TLB is repartitioned 134 such that all available TLB locations are allocated to the testcase. Next, the TLB entries used by the testcase are reassigned 136 as needed to TLB locations within the expanded TLB partition. A warning 137 is then generated to indicate that this particular testcase must be run in a stand-alone mode, where any parallel execution of other instruction streams is stopped while the testcase is executed. The modified testcase is marked runable on the new architecture, and outputted 140.

Remaining testcases are flagged 142 as requiring manual conversion. TLB requirements of these testcases are outputted 144 to assist an engineer in conversion.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. A computer having the code loaded or executing on it is generally a computer program product because it incorporates DRAM and/or disk memory having the code recorded in it.

What is claimed is:

1. A method of converting a testcase designed to execute on a first member of a processor family to a converted testcase for execution on a second member of a processor family, where both the first and second members of the processor family incorporate a TLB and where the testcase uses a plurality of locations within the TLB, the method comprising the steps of:

reading the testcase into a digital computer;

automatically comparing each TLB location used by the testcase to TLB locations available in the second member of the processor family;

if the testcase uses only TLB locations that are available in the second member of the processor family, indicating that the testcase is runable on the second member of the processor family;

counting TLB locations used by the testcase;

determining whether the number of TLB entries used by the testcase is less than or equal to a number of TLB entries available in the TLB of the second member of the processor family; and if the TLB of the second member of the processor family has sufficient space for the entries used, reassigning TLB entries used by the testcase to those available in the TLB of the second member of the processor family, and outputting the altered testcase.

2. The method of claim 1, wherein the step of reassigning TLB entries is performed by steps comprising altering setup information of the testcase.

3. The method of claim 2, wherein the step of reassigning TLB entries is performed by steps further comprising altering TLB addresses referenced by instructions of test code of the testcase.

4. A method of converting a testcase designed to execute on a first member of a processor family to a converted testcase for execution on a second member of a processor family, where both the first and second members of the processor family incorporate a TLB, where the testcase uses a plurality of locations within the TLB, and where the second member of the processor family comprises multiple processor cores, the method comprising the steps of:

reading the testcase into a digital computer;

automatically comparing each TLB location used by the testcase to TLB locations available in a standard partition of the TLB of second member of the processor family;

if the testcase uses only TLB locations that are available in the standard partition of the TLB of the second member of the processor family, indicating that the testcase is runable on the second member of the processor family;

counting TLB locations used by the testcase;

determining whether the number of TLB entries used by the testcase is less than or equal to a number of TLB entries available in the standard partition in the TLB of the second member of the processor family; and if the standard TLB partition has sufficient space for the entries used, reassigning TLB entries used by the testcase to those available in the standard partition of the TLB of the second member of the processor family, and outputting the altered testcase.

5. The method of claim 4, wherein the step of reassigning TLB entries is performed by steps comprising altering setup information of the testcase.

6. The method of claim 5, wherein the step of reassigning TLB entries is perfomed by steps further comprising altering TLB addresses referenced by instructions of test code of the testcase.

7. The method of claim 4, further comprising the steps of:

if the standard TLB partition lacks sufficient space for the entries used, determining whether the number of TLB entries used by the testcase is less than or equal to a number of TLB entries available in an enlarged partition in the TLB of the second member of the processor family; and if the standard TLB partition has sufficient space for the entries used, reassigning TLB entries used by the testcase to those available in the enlarged partition of the TLB of the second member of the processor family, and outputting the altered testcase with indication that it requires an enlarged partition.

8. The method of claim 7, wherein the step of reassigning TLB entries is performed by steps comprising altering setup information of the testcase.

9. The method of claim 7, wherein the step of reassigning TLB entries is perfomed by steps further comprising altering TLB addresses referenced by instructions of test code of the testcase.

10. A computer program product comprising a machine readable media having recorded therein machine readable instructions for converting a testcase designed to execute on a first member of a processor family to a converted testcase for execution on a second member of a processor family, where both the first and second members of the processor family incorporate a TLB and where the testcase uses a plurality of locations within the TLB, the machine readable instructions comprising instructions for:

reading the testcase into memory of a digital computer;

automatically comparing each TLB location used by the testcase to TLB locations available in the second member of the processor family;

if the testcase uses only TLB locations that are available in the second member of the processor family, indicating that the testcase is runable on the second member of the processor family;

counting TLB locations used by the testcase;

determining whether the number of TLB entries used by the testcase is less than or equal to a number of TLB entries available in the TLB of the second member of the processor family; and if the TLB of the second member of the processor family has sufficient space for the entries used, reassigning TLB entries used by the testcase to those available in the TLB of the second member of the processor family, and outputting the altered testcase.

11. The computer program product of claim 10, wherein reassigning TLB entries is performed by instructions comprising instructions for altering setup information of the testcase.

12. The computer program product of claim 11, wherein reassigning TLB entries is performed by instructions further comprising instructions for altering TLB addresses referenced by instructions of test code of the testcase.

13. A computer program product for converting a testcase designed to execute on a first member of a processor family to a converted testcase for execution on a second member of a processor family, where both the first and second members of the processor family incorporate a TLB, where the testcase uses a plurality of locations within the TLB, and where the second member of the processor family comprises multiple processor cores, the computer program product comprising machine readable media containing machine readable instructions for:

reading the testcase into a digital computer;

automatically comparing each TLB location used by the testcase to TLB locations available in a standard partition of the TLB of second member of the processor family;

if the testcase uses only TLB locations that are available in the standard partition of the TLB of the second member of the processor family, indicating that the testcase is runable on the second member of the processor family;

counting TLB locations used by the testcase;

determining whether the number of TLB entries used by the testcase is less than or equal to a number of TLB entries available in the standard partition in the TLB of the second member of the processor family; and if the standard TLB partition has sufficient space for the entries used, reassigning TLB entries used by the testcase to those available in the standard partition of the TLB of the second member of the processor family, and outputting the altered testcase.

14. The computer program product of claim 13, wherein reassigning TLB entries is performed by machine readable instructions comprising instructions for altering setup information of the testcase.

15. The computer program product of claim 14, wherein reassigning TLB entries is perfomed by machine readable instructions further comprising instructions for altering TLB addresses referenced by instructions of test code of the testcase.

16. The computer program product of claim 15, further comprising machine readable instructions for:

if the standard TLB partition lacks sufficient space for the entries used, determining whether the number of TLB entries used by the testcase is less than or equal to a number of TLB entries available in an enlarged partition in the TLB of the second member of the processor family; and if the standard TLB partition has sufficient space for the entries used, reassigning TLB entries used by the testcase to those available in the enlarged partition of the TLB of the second member of the processor family, and outputting the altered testcase with indication that it requires an enlarged partition.

* * * * *